(12) United States Patent
Zhu et al.

(10) Patent No.: US 12,736,977 B2
(45) Date of Patent: Sep. 15, 2026

(54) GRID MAP-BASED ROBOT PATHFINDING METHOD AND APPARATUS, ROBOT AND STORAGE MEDIUM

(71) Applicant: Suzhou Cleva Precision Machinery & Technology Co., Ltd., Suzhou (CN)

(72) Inventors: Shaoming Zhu, Suzhou (CN); Lichao Yuan, Suzhou (CN)

(73) Assignee: Suzhou Cleva Precision Machinery & Technology Co., Ltd, Suzhou (CN)

( * ) Notice: Subject to any disclaimer, the term of this patent is extended or adjusted under 35 U.S.C. 154(b) by 80 days.

(21) Appl. No.: 18/838,391

(22) PCT Filed: Feb. 23, 2023

(86) PCT No.: PCT/CN2023/077838
§ 371 (c)(1),
(2) Date: Aug. 14, 2024

(87) PCT Pub. No.: WO2023/160606
PCT Pub. Date: Aug. 31, 2023

(65) Prior Publication Data

US 2025/0155894 A1 May 15, 2025

(30) Foreign Application Priority Data

Feb. 24, 2022 (CN) ......................... 202210174621.6

(51) Int. Cl.
*G05D 1/246* (2024.01)
*G05D 1/622* (2024.01)
(Continued)

(52) U.S. Cl.
CPC ........... *G05D 1/2464* (2024.01); *G05D 1/622* (2024.01); *G05D 1/644* (2024.01); *G05D 1/648* (2024.01); *G05D 2105/15* (2024.01)

(58) Field of Classification Search
CPC ...... G05D 1/2464; G05D 1/622; G05D 1/644; G05D 1/648; G05D 2105/15;
(Continued)

(56) References Cited

U.S. PATENT DOCUMENTS

| | | | | |
|---|---|---|---|---|
| 8,204,623 | B1 * | 6/2012 | Bhattacharyya | B25J 9/1666 700/1 |
| 12,512,006 | B2 * | 12/2025 | May | G08G 5/80 |

(Continued)

FOREIGN PATENT DOCUMENTS

| | | |
|---|---|---|
| CN | 105511457 | 4/2016 |
| CN | 110823241 | 2/2020 |

(Continued)

OTHER PUBLICATIONS

International Search Report for Application No. PCT/CN2023/077838, filed Jun. 15, 2023 with English translation.

*Primary Examiner* — Thomas Ingram
(74) *Attorney, Agent, or Firm* — JK Intellectual Property Law, PA

(57) ABSTRACT

A grid map-based robot pathfinding method includes obtaining a first grid map and a second grid map, wherein the second grid map is generated by merging grids in the first grid map, and the resolution of the second grid map is lower than that of the first grid map; planning a travel path of a robot from a current position to a preset target point according to the second grid map; and determining an obstacle position if the travel path is impassable, determining a first path of the robot from the current position to the obstacle position based on the second grid map, and determining a second path of the robot from the preset target point to the obstacle position based on the second grid map; planning a transition path from an endpoint of the first path to an endpoint of the second path according to the first grid map; and obtaining a target path of the robot according to the first
(Continued)

path, the second path, and the transition path. Related apparatus, robots, and readable non-transitory storage medium are disclosed.

10 Claims, 7 Drawing Sheets

(51) Int. Cl.
*G05D 1/644* (2024.01)
*G05D 1/648* (2024.01)
*G05D 105/15* (2024.01)

(58) Field of Classification Search
CPC ........... G05D 2107/23; G05D 2109/10; G01C 21/20; G01C 21/3833; G01C 21/3881
See application file for complete search history.

(56) References Cited

U.S. PATENT DOCUMENTS

| | | | | |
|---|---|---|---|---|
| 2012/0016872 | A1* | 1/2012 | Khorashadi | G01C 21/20<br>707/724 |
| 2020/0340826 | A1* | 10/2020 | Li | G01C 21/383 |
| 2021/0018929 | A1* | 1/2021 | Choi | G05D 1/0246 |
| 2022/0022716 | A1* | 1/2022 | Wu | G05D 1/648 |
| 2024/0201700 | A1* | 6/2024 | Yan | G05D 1/2297 |

FOREIGN PATENT DOCUMENTS

| | | |
|---|---|---|
| CN | 112462763 | 3/2021 |
| CN | 113432610 | 9/2021 |
| JP | 20007249632 | 9/2007 |
| WO | WO 2017161431 | 9/2017 |

* cited by examiner

1300

1301

Obtaining module

1303

Planning unit

1305

Processing unit

GRID MAP-BASED ROBOT PATHFINDING METHOD AND APPARATUS, ROBOT AND STORAGE MEDIUM

CROSS-REFERENCE TO RELATED PATENT APPLICATIONS

This application is a national stage of International Application No. PCT/CN2023/077838, filed on Feb. 23, 2023, which claims priority to CN patent application Ser. No. 20/221,0174621.6, filed on Feb. 24, 2022. All of the aforementioned applications are hereby incorporated by reference in their entireties.

TECHNICAL FIELD

The present disclosure relates to the technical field of robot path planning, in particular to a grid map-based robot pathfinding method and apparatus, a robot, and a non-transitory storage medium.

BACKGROUND

In the prior art, an intelligent robot mower usually creates a grid map for a lawn to guide the robot's travel. However, when the lawn has a large area and there are many grids, the time for the robot mower to search for a path increases, and the computing memory increases, resulting in a decrease in the travel efficiency of the robot. Sometimes the searched path may follow a boundary or obstacle, and the robot is prone to collision when traveling along the path.

SUMMARY

The technical problem to be solved by embodiments of the present disclosure is to provide a grid map-based robot pathfinding method and apparatus, a robot, and a non-transitory storage medium, which can reduce path search time, reduce memory computing consumption, improve the travel efficiency of the robot, and avoid collision caused by the fact that the robot is too close to a boundary or obstacle.

In order to solve the above technical problem, the present disclosure provides a grid map-based robot pathfinding method, including:

obtaining a first grid map and a second grid map, where the second grid map is generated by merging grids in the first grid map, and the resolution of the second grid map is lower than that of the first grid map;

planning a travel path of a robot from a current position to a preset target point according to the second grid map; and determining an obstacle position in a case where the travel path is impassable, determining a first path of the robot from the current position to the obstacle position based on the second grid map, and determining a second path of the robot from the preset target point to the obstacle position based on the second grid map;

planning a transition path from an endpoint of the first path to an endpoint of the second path according to the first grid map; and obtaining a target path of the robot according to the first path, the second path, and the transition path.

In a feasible implementation, after the step of planning a travel path of a robot from a current position to a preset target point according to the second grid map, the method further includes:

determining whether the travel path is passable; and determining the travel path as a target path of the robot in a case where the travel path is passable.

In a feasible implementation, before the step of obtaining a first grip map and a second grid map, the method further includes:

generating the first grid map based on positioning data, where the first grid map is composed of a plurality of first grids, and the positioning data includes boundary point values and obstacle information;

generating the second grid map by merging the first grids in the first grid map, where the second grid map is composed of a plurality of second grids, and the area of the second grid is greater than that of the first grid; and determining an attribute of each second grid in the second grid map according to attributes of the first grids used for generating the second grid, where the attribute includes passable or impassable.

In a feasible implementation, the step of generating the second grid map by merging the first grids in the first grid map includes:

performing sparse processing on the first grid map to obtain a temporary grid map;

designating grids in the temporary grid map that overlap with the first grids having impassable attributes in the first grid map as first target grids; and in a case where edges of the first target grids and the first grids overlap, merging the first target grids and grids adjacent to the first target grids in the temporary grid map to obtain a merged temporary grid map, and designating the merged temporary grid map as the second grid map.

In a feasible implementation, the step of determining an attribute of each second grid in the second grid map according to attributes of the first grids used for generating the second grid includes:

determining that the attribute of the second grid is passable if the attributes of all the first grids used for generating the second grid are passable; or determining that the attribute of the second grid is impassable if the attributes of all the first grids used for generating the second grid include impassable.

In a feasible implementation, the step of planning a travel path of a robot from a current position to a preset target point according to the second grid map includes:

performing path search on the second grid map to obtain a first set of feasible paths from the current position to the preset target point; and designating the shortest path among the first set of feasible paths as the travel path.

In a feasible implementation, the step of planning a transition path from an endpoint of the first path to an endpoint of the second path according to the first grid map includes:

determining positions of the endpoint of the first path and the endpoint of the second path on the first grid map;

performing path search on the first grid map to obtain a second set of feasible paths from the endpoint of the first path to the endpoint of the second path; and designating the shortest path among the second set of feasible paths as the travel path.

A second aspect of the present application provides a grid map-based robot pathfinding apparatus, including:

an obtaining module, configured to obtain a first grid map and a second grid map, where the second grid map is generated by merging grids in the first grid map, and the resolution of the second grid map is lower than that of the first grid map;

a planning unit, configured to plan a travel path of a robot from a current position to a preset target point according to the second grid map; and a processing unit, configured to:

determine an obstacle position in a case where the travel path is impassable, determine a first path of the robot from the current position to the obstacle position based on the second grid map, and determine a second path of the robot from the preset target point to the obstacle position based on the second grid map;

plan a transition path from an endpoint of the first path to an endpoint of the second path according to the first grid map; and obtain a target path of the robot according to the first path, the second path, and the transition path.

A third aspect of the present application provides a robot, including a memory and a processor, the memory storing a computer program, where when the processor executes the computer program, the steps of the aforementioned grid map-based robot pathfinding method are implemented.

A fourth aspect of the present application provides a readable non-transitory storage medium, storing a computer program, where when the computer program is executed by a processor, the steps of the aforementioned grid map-based robot pathfinding method are implemented.

The implementation of the present disclosure has the following beneficial effects:

The present application provides a grid map-based robot pathfinding method and apparatus, a robot, and a storage medium, including: obtaining a first grid map and a second grid map generated by merging and optimizing grids of the first grid map, planning a travel path of a robot from a current position to a preset target point according to the second grid map, determining an obstacle position when the travel path is impassable, planning a first path from the current position to the obstacle position and a second path from the preset target point to the obstacle position based on the second grid map, and planning a transition path across the obstacle position according to the first grid map, thereby obtaining a target path of the robot.

By reasonably switching between the first grid map and the second grid map when the robot searches for paths to plan the target path of the robot, the path search time of the robot is reduced, the memory computing understood that the above general description and the following detailed description are exemplary and explanatory only, and are not intended to limit the present application.

BRIEF DESCRIPTION OF THE DRAWINGS

The accompanying drawings here are incorporated into the description and constitute a part of the description, show embodiments consistent with the present application, and are used for explaining the principle of the present application together with the description, rather than constituting improper limitation to the present application.

DETAILED DESCRIPTION

Figure 1:
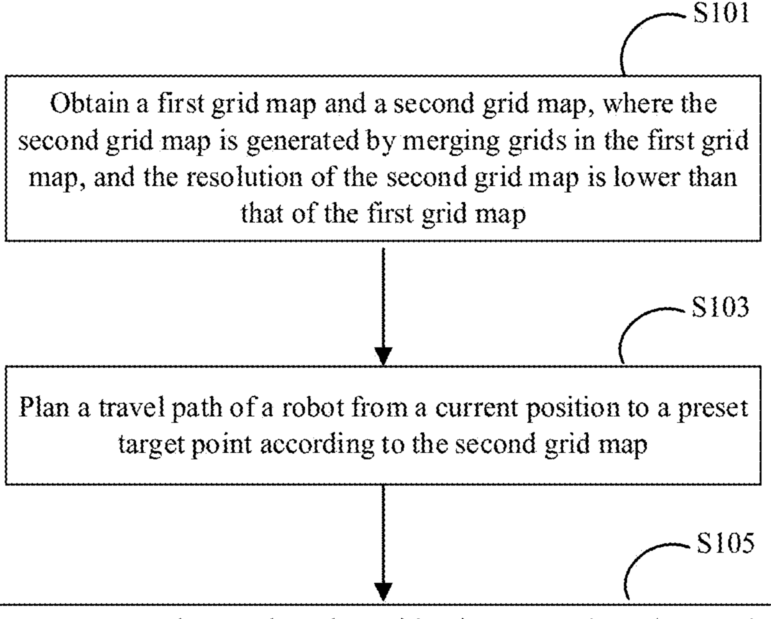
FIG. 1 is a schematic flowchart of a grid map-based robot pathfinding method provided in an implementation of the present disclosure.

In order to make the above objectives, features and advantages of the present disclosure more obvious and understandable, the specific embodiments of the present disclosure will be described in detail below with reference to the accompanying drawings. Many specific details are elaborated in the following description to facilitate full understanding of the present disclosure. However, the present disclosure can be implemented in many other ways different from those described herein, and those skilled in the art can make similar improvements without violating the content of the present disclosure. Therefore, the present disclosure is not limited by the specific embodiments disclosed below.

Notably, the terms "first", "second", and the like in the description, claims, and accompanying drawings of the present disclosure are used for distinguishing similar objects and do not need to be used for describing a specific order or sequence. Understandably, the data used in such a way are interchangeable in proper circumstances, so that the embodiments of the present disclosure described herein can be implemented in other orders than the order illustrated or described herein. The implementations described in the following exemplary embodiments do not represent all implementations consistent with the present disclosure. Instead, they are merely examples of apparatuses and methods consistent with some aspects of the present disclosure described as detailed in the appended claims.

Unless otherwise defined, all technical and scientific terms used herein have the same meanings as commonly understood by those of ordinary skill in the technical field of the present disclosure. The terms used in the description of the present disclosure are only for the purpose of describing specific embodiments, but are not intended to limit the present disclosure. The term "and/or" used herein includes any and all combinations of one or more relevant listed items.

The robot system of the present disclosure may be a robot mower system, a robot cleaner system, a snow sweeper system, a leaf suction machine system, a golf course picker system, etc. Each system can automatically travel in a work area and perform corresponding work. In specific examples of the present disclosure, the robot system is a robot mower system as an example for detailed description. Correspondingly, the work area may be a lawn.

The robot mower system usually includes: a robot mower (RM), a charging station, and a boundary line. The robot mower includes: a body, and a travel unit and a control unit are arranged on the body. The travel unit is configured to control the travel, turning, etc. of the robot; the control unit is configured to plan a travel direction and travel route of the robot, store external parameters obtained by the robot, process and analyze the obtained parameters, and specifically control the robot according to the processing and analyzing results; and the control unit is, for example, an MCU or a DSP.

Notably, the robot mower of the present disclosure further includes: a camera apparatus and a fixed-point positioning apparatus in cooperation with the control unit, where the camera apparatus is configured to obtain a scenario at its viewing angle within a certain range. In a specific example of the present disclosure, the camera apparatus positions an outer boundary by image analysis, and the fixed-point positioning system positions an inner boundary area enclosed by the outer boundary by searching for coordinate points on a working path. Further, the control unit combined with the camera apparatus and the fixed-point positioning apparatus controls the robot to traverse the work area. The following content will provide described description.

In addition, the robot further includes: various sensors and storage modules, such as an EPROM, a Flash or an SD card, as well as a working mechanism for working, and a power supply. In this embodiment, the working mechanism includes a mowing cutter head, and various sensors for sensing the traveling state of the traveling robot, such as toppling, ground clearance, collision and geomagnetic sensors and a gyroscope, which will not be described in detail here.

As shown in FIG. 1, an implementation of the present disclosure provides a grid map-based robot pathfinding method. The method includes the following steps:

S101. Obtain a first grid map and a second grid map, where the second grid map is generated by merging grids in the first grid map, and the resolution of the second grid map is lower than that of the first grid map;

S103. Plan a travel path of a robot from a current position to a preset target point according to the second grid map;

S105. Determine an obstacle position in a case where the travel path is impassable, determine a first path of the robot from the current position to the obstacle position based on the second grid map, and determine a second path of the robot from the preset target point to the obstacle position based on the second grid map;

plan a transition path from an endpoint of the first path to an endpoint of the second path according to the first grid map; and obtain a target path of the robot according to the first path, the second path, and the transition path.

In a specific implementation of the present disclosure, a work area of a robot mower, namely, a lawn is divided into grids to generate the first grid map. The generation method of the grid map is already mature in existing technologies and will not be described in detail herein. The second grid map is obtained by merging the first grid map. When the robot mower is working, the travel path from the current position to the preset target point is planned based on the second grid map. When there is an obstacle on the lawn that makes it impossible for the robot to pass through based on the second grid map, the first path and the second path from the current position and the preset target point to the obstacle are first planed respectively, and then the transition path from the endpoint of the first path to the endpoint of the second path is planned according to the first grid map, thereby obtaining the target path of the robot mower.

For ease of understanding, the present disclosure describes a specific example for reference with regard to the above implementation.

Figure 2:
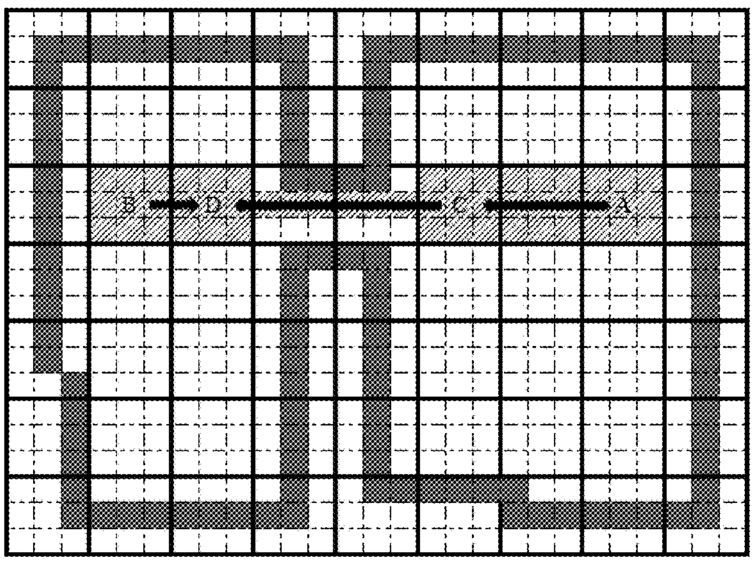
FIGS. 2, 4, and 6 are schematic diagrams of different examples of the present disclosure.

As shown in FIG. 2, the robot mower travels on the lawn, and the lawn is divided into grids, where the first grid map includes dashed boxes shown in the figure, the second grid map includes solid boxes shown in the figure, a grid in the solid box of the second grid map is obtained by merging 9 grids in the dashed box of the first grid map, and the boundary of the lawn is the filled portion shown in the figure. It is found that the travel path of the robot mower from the current position A to the preset target point B, planned according to the second grid map, is impassable. In this case, the first path from point A to point C is planned according to the second grid map, the second path from point B to point D is planned according to the second grid map, then the planning is switched to the first grip map, the transition path of the robot from point C to point D is planned according to the first grid map, and the target path of the robot from the current position A to the preset target point B is obtained according to the first path, the reverse path of the second path and the transition path.

Figure 3:
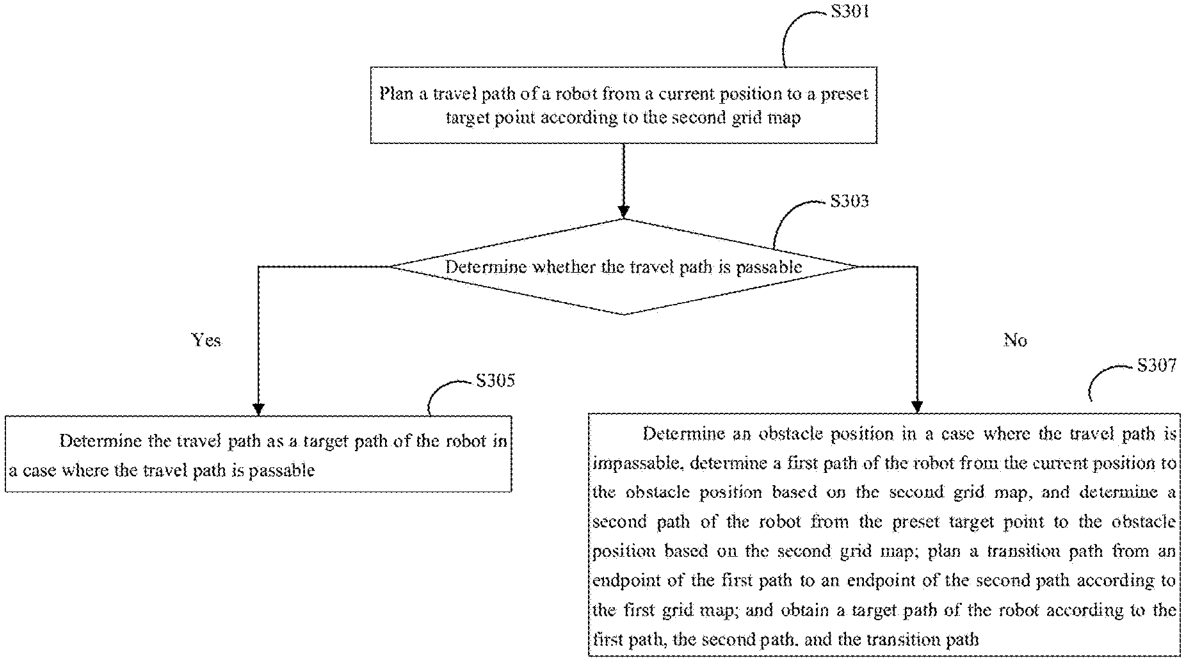
FIGS. 3, 5, 7, 11, and 12 are schematic flowcharts of a specific implementation process of one of the steps in FIG. 1.

In a possible implementation, as shown in FIG. 3, after the step of planning a travel path of a robot from a current position to a preset target point according to the second grid map (namely, S301), the method further includes: S303. Determine whether the travel path is passable;

S305. Determine the travel path as a target path of the robot in a case where the travel path is passable;

S307. Determine an obstacle position in a case where the travel path is impassable, determine a first path of the robot from the current position to the obstacle position based on the second grid map, and determine a second path of the robot from the preset target point to the obstacle position based on the second grid map;

plan a transition path from an endpoint of the first path to an endpoint of the second path according to the first grid map; and obtain a target path of the robot according to the first path, the second path, and the transition path.

Figure 4:
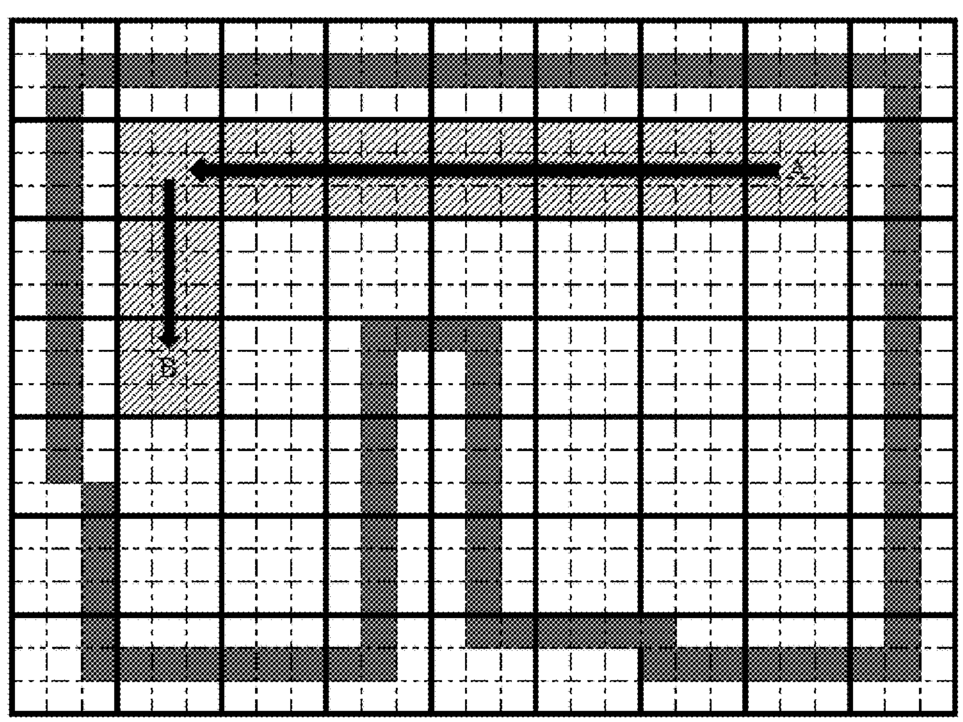

As shown in FIG. 4, the robot mower travels on the lawn, and the lawn is divided into grids, where the first grid map includes dashed boxes shown in the figure, the second grid map includes solid boxes shown in the figure, a grid in the solid box of the second grid map is obtained by merging 9 grids in the dashed box of the first grid map, and the boundary of the lawn is the filled portion shown in the figure. The travel path of the robot mower from the current position A to the preset target point B is planned according to the second grid map, whether the travel path from point A to point B is passable is determined, the travel path of the robot from point A to point B is passable according to the second grid map, and the travel path is determined as the target path of the robot.

Figure 5:
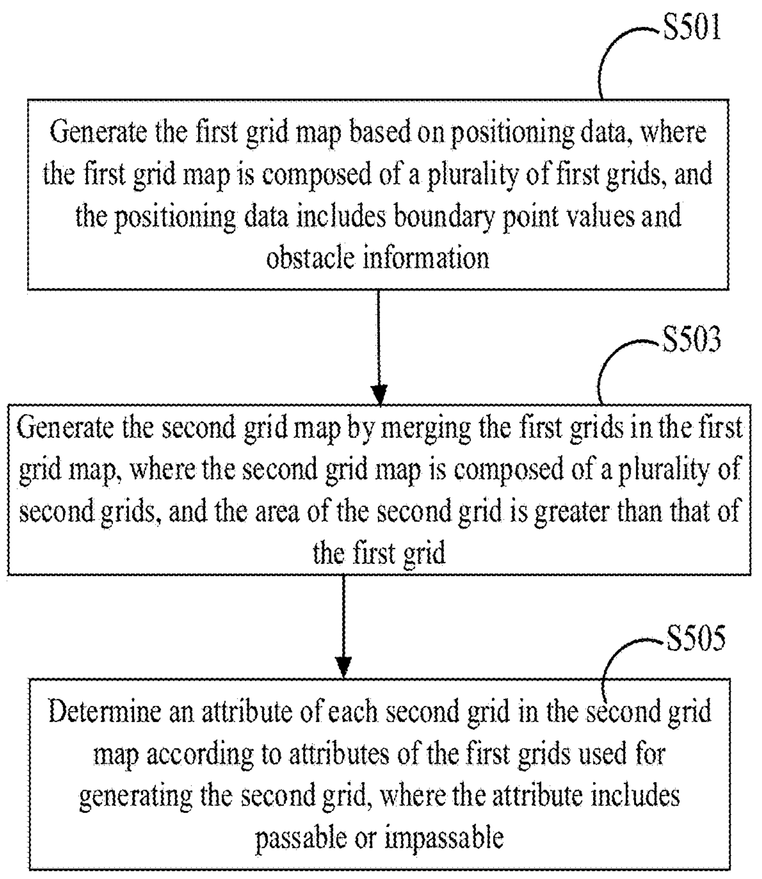

In a possible implementation, as shown in FIG. 5, before the step of obtaining a first grip map and a second grid map, the method further includes:

S501. Generate the first grid map based on positioning data, where the first grid map is composed of a plurality of first grids, and the positioning data includes boundary point values and obstacle information;

S503. Generate the second grid map by merging the first grids in the first grid map, where the second grid map is composed of a plurality of second grids, and the area of the second grid is greater than that of the first grid;

S505. Determine an attribute of each second grid in the second grid map according to attributes of the first grids used for generating the second grid, where the attribute includes passable or impassable.

Further, the step of determining an attribute of each second grid in the second grid map according to attributes of the first grids used for generating the second grid includes:

determining that the attribute of the second grid is passable if the attributes of all the first grids used for generating the second grid are passable; or determining that the attribute of the second grid is impassable if the attributes of all the first grids used for generating the second grid include impassable.

The positioning data includes boundary point values and obstacle information. The robot generates the first grid map based on the boundary point values and the obstacle information, and then merges the first grids of the first grid map to generate the second grid map. The second grid in the second grid map is composed of a plurality of first grids in the first grid map, and the attribute of the second grid is the same as that of the corresponding first grids, including a passable attribute or an impassable attribute, where the impassable attribute further includes boundary attributes and obstacle attributes. When the attributes of the first grids used for generating the second grid are all passable, the attribute of the corresponding second grid is passable. When the attribute of at least one of the first grids for generating the second grid is impassable, the attribute of the corresponding second grid is impassable.

Figure 6:
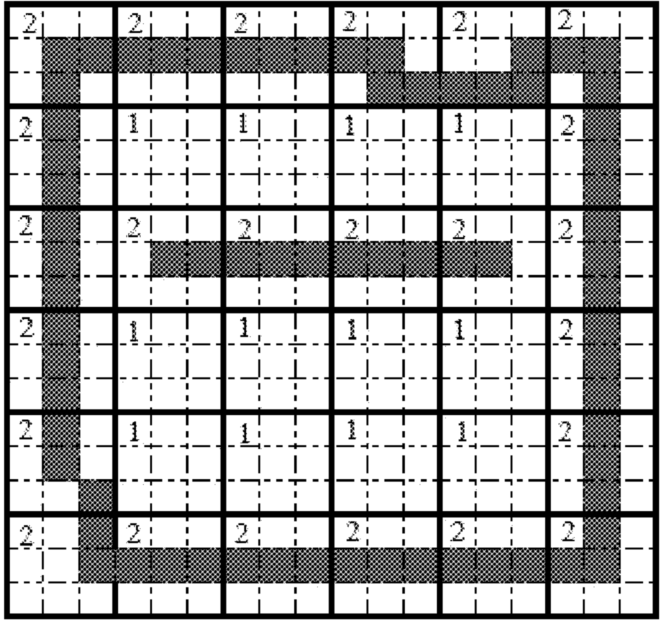

As shown in FIG. 6, the robot generates the first grid map with first grids in dashed boxes based on the boundary point values and the obstacle information, and merges the first grids in the first grid map to generate the second grid map with second grids in solid boxes, where the second grid is composed of 9 first grids, the passable attribute is marked as 1, the impassable attribute is marked as 2, the attribute of the filled area in the figure is impassable, the attribute of the unfilled area is passable, and the upper left corner of each second grid shows the attribute of the second grid. When the attribute of at least one of the first grids composing the second grid is impassable, the attribute of the corresponding second grid is impassable. When the attributes of the first grids composing the second grid are all passable, the attribute of the corresponding second grid is passable.

Figure 7:
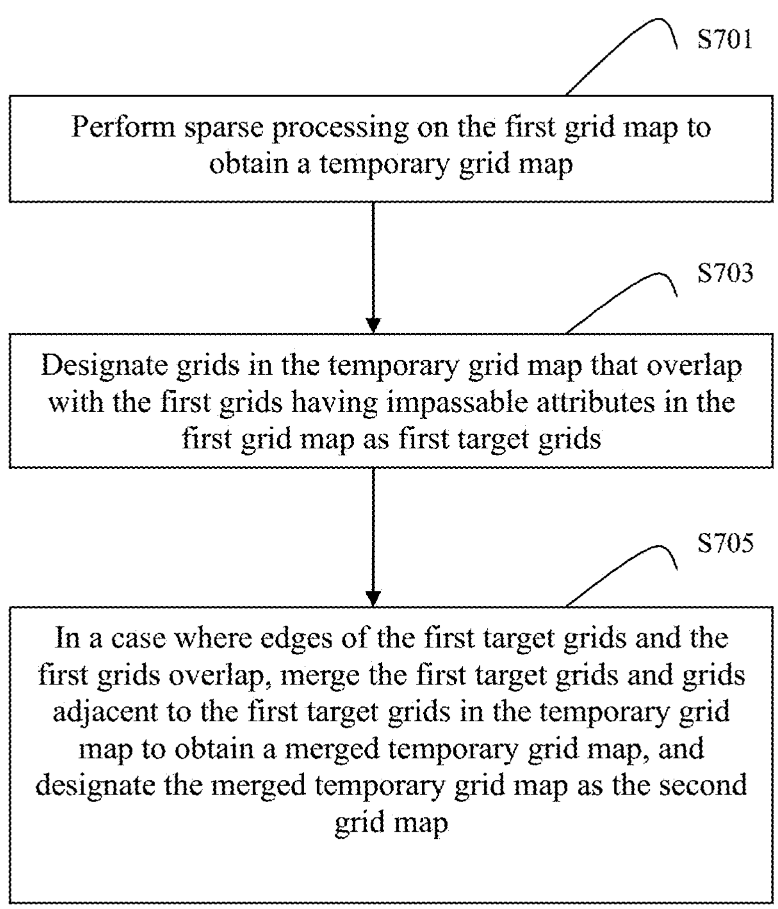

In a possible implementation, as shown in FIG. 7, the step of generating the second grid map by merging the first grids in the first grid map includes:

S701. Perform sparse processing on the first grid map to obtain a temporary grid map;

S703. Designate grids in the temporary grid map that overlap with the first grids having impassable attributes in the first grid map as first target grids;

S705. In a case where edges of the first target grids and the first grids overlap, merge the first target grids and grids adjacent to the first target grids in the temporary grid map to obtain a merged temporary grid map, and designate the merged temporary grid map as the second grid map.

Figure 8:
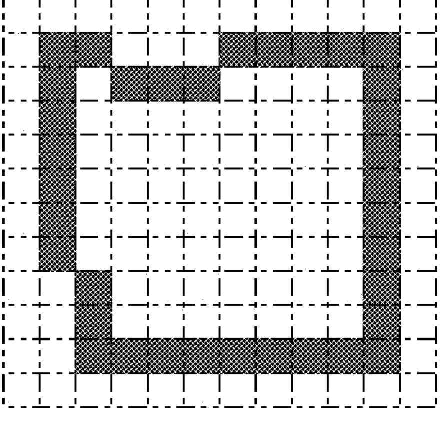
FIG. 8 is a schematic diagram of a first grid map in a specific example of the present disclosure.
Figure 9:
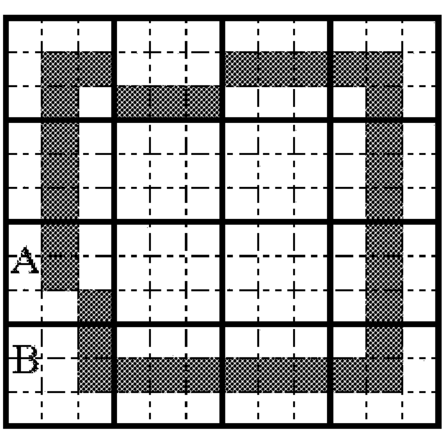
FIG. 9 is a schematic diagram of a temporary grid map obtained after processing in FIG. 8.
Figure 10:
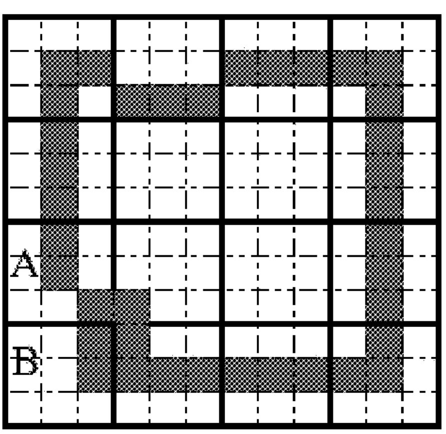
FIG. 10 is a schematic diagram of a second grid map obtained after processing in FIG. 9.

In the working process of the robot, the grid processing on the lawn is the existing technology. In specific implementations of the present disclosure, in order to avoid collision between the robot and a boundary or obstacle, the grids where the boundary or obstacle is located will be further processed, so that the first grids where the corresponding boundary or obstacle is located in the second grid where the final boundary or obstacle is located are located at the middle part of the corresponding second grid, thereby avoiding robot collision. Refer to FIG. 8, FIG. 9, and FIG. 10, where FIG. 8 shows the boundary of the lawn. The first grid map with first grids in dashed boxes is generated based on the positioning data, and sparse processing is performed on the first grid map to obtain the temporary grid map shown in FIG. 9, where a temporary grid of the temporary grid map is composed of 9 first grids. Grid A and grid B are taken as target grids, and grid A and grid B are merged with adjacent grids on the right side to obtain the second grid map shown in FIG. 10. When the travel path of the robot is planned based on the second grid map, collision between the robot and the boundary or obstacle can be avoided, and the travel efficiency of the robot can be improved.

Figure 11:
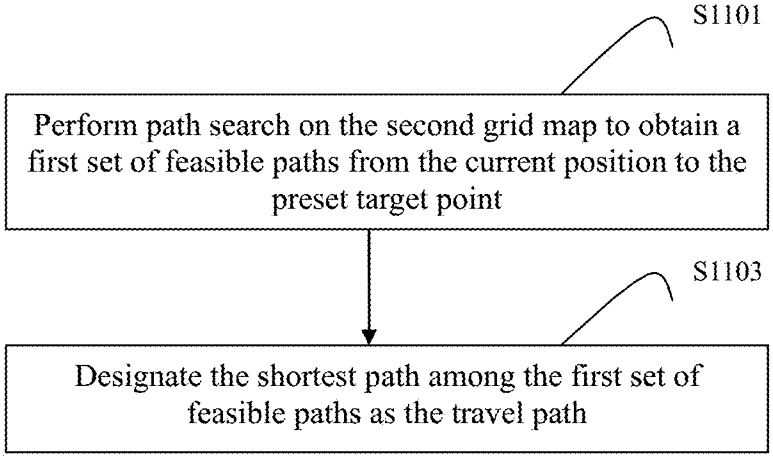

In a possible implementation, as shown in FIG. 11, the step of planning a travel path of a robot from a current position to a preset target point according to the second grid map includes:

S1101. Perform path search on the second grid map to obtain a first set of feasible paths from the current position to the preset target point;

S1103. Designate the shortest path among the first set of feasible paths as the travel path.

The first set of feasible paths from the current position to the preset target point are planned according to the second grid map. In the actual work of the robot mower, there may be a plurality of optional paths. In order to save power, the robot will choose the shortest path among the first set of feasible paths as the actual travel path.

Figures 12, 13:
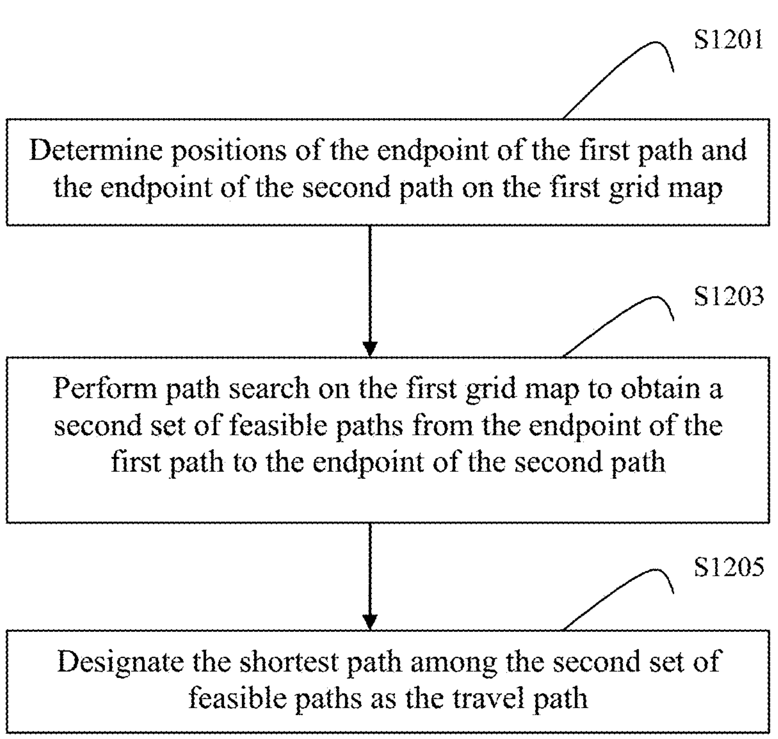
FIG. 13 is a schematic diagram of modules of a grid map-based robot pathfinding apparatus provided by the present disclosure.

In a possible implementation, as shown in FIG. 12, the step of planning a transition path from an endpoint of the first path to an endpoint of the second path according to the first grid map includes:

S1201. Determine positions of the endpoint of the first path and the endpoint of the second path on the first grid map;

S1203. Perform path search on the first grid map to obtain a second set of feasible paths from the endpoint of the first path to the endpoint of the second path;

S1205. Designate the shortest path among the second set of feasible paths as the travel path.

The second set of feasible paths from the endpoint of the first path to the endpoint of the second path are planned according to the first grid map. In the actual work of the robot mower, there may be a plurality of optional paths. In order to save power, the robot will choose the shortest path among the second set of feasible paths as the actual travel path.

In an implementation of the present disclosure, a grid map-based robot pathfinding apparatus 1300 is provided, including:

an obtaining module 1301, configured to obtain a first grid map and a second grid map, where the second grid map is generated by merging grids in the first grid map, and the resolution of the second grid map is lower than that of the first grid map;

a planning unit 1303, configured to plan a travel path of a robot from a current position to a preset target point according to the second grid map; and a processing unit 1305, configured to determine an obstacle position in a case where the travel path is impassable, determine a first path of the robot from the current position to the obstacle position based on the second grid map, and determine a second path of the robot from the preset target point to the obstacle position based on the second grid map; plan a transition path from an endpoint of the first path to an endpoint of the second path according to the first grid map; and obtain a target path of the robot according to the first path, the second path, and the transition path.

Further, as shown in FIG. 13, the obtaining module 1301 is configured to implement S101, the planning unit 1303 is configured to implement S103, and the processing unit 1305 is configured to implement S105. Those skilled in the art can clearly understand that, for the convenience and conciseness of description, the specific working process of the apparatus described above can refer to the corresponding process in the implementation of the above method, and will not be elaborated here.

In an implementation of the present disclosure, a robot is further provided, including a memory and a processor, the memory storing a computer program, where when the processor executes the computer program, the steps of the grid map-based robot pathfinding method in the implementation of the aforementioned method are implemented.

In an implementation of the present disclosure, a readable storage medium is further provided, storing a computer program, where when the computer program is executed by a processor, the steps of the grid map-based robot pathfinding method in the implementation of the aforementioned method are implemented.

A person skilled in the art would readily conceive of other embodiments of the present disclosure after considering the description and practicing the disclosure disclosed herein. The present application is intended to cover any variations, uses or adaptive changes of the present disclosure. These variations, uses or adaptive changes follow the general principle of the present disclosure and include common general knowledge or conventional technical means in the technical field that are not disclosed in the present disclosure. The description and the embodiments are merely regarded as exemplary, and the real scope and spirit of the present disclosure are pointed out by the following claims.

It should be understood that the present disclosure is not limited to the precise structure described above and shown in the accompanying drawings, and various modifications and changes can be made without departing from its scope. The scope of the present disclosure is only limited by the appended claims.

We claim:

1. A grid map-based robot pathfinding method for driving a robot to a target point while avoiding an obstacle, the method, comprising the steps of:

- obtaining a first grid map and a second grid map, wherein the second grid map is generated by merging grids in the first grid map, and the resolution of the second grid map is lower than that of the first grid map;
- planning a travel path of a robot from a current position to a preset target point according to the second grid map; and
- determining an obstacle position if the travel path is impassable, determining a first path of the robot from the current position to the obstacle position based on the second grid map, and determining a second path of the robot from the preset target point to the obstacle position based on the second grid map;
- planning a transition path from an endpoint of the first path to an endpoint of the second path according to the first grid map;
- obtaining a target path of the robot according to the first path, the second path, and the transition path; and
- driving the robot from the current position to the preset target point by following the target path.

2. The method according to claim 1, wherein after the step of planning a travel path of a robot from a current position to a preset target point according to the second grid map, the method further comprises the steps of:

- determining whether the travel path is passable; and
- determining the travel path as a target path of the robot if the travel path is passable.

3. The method according to claim 2, wherein the step of planning a travel path of a robot from a current position to a preset target point according to the second grid map comprises the steps of:

- performing a path search on the second grid map to obtain a first set of feasible paths from the current position to the preset target point; and
- designating the shortest path among the first set of feasible paths as the travel path.

4. The method according to claim 1, wherein before the step of obtaining a first grip map and a second grid map, the method further comprises the steps of:

- generating the first grid map based on positioning data, wherein the first grid map is composed of a plurality of first grids, and the positioning data comprises boundary point values and obstacle information;
- generating the second grid map by merging the first grids in the first grid map, wherein the second grid map is composed of a plurality of second grids, and the area of the second grid is greater than that of the first grid; and
- determining an attribute of each second grid in the second grid map according to attributes of the first grids used for generating the second grid, wherein the attribute comprises passable or impassable.

5. The method according to claim 3, wherein the step of generating the second grid map by merging the first grids in the first grid map comprises the steps of:

- performing sparse processing on the first grid map to obtain a temporary grid map;
- designating grids in the temporary grid map that overlap with the first grids having impassable attributes in the first grid map as first target grids; and
- if edges of the first target grids and the first grids overlap, merging the first target grids and grids adjacent to the first target grids in the temporary grid map to obtain a merged temporary grid map, and
- designating the merged temporary grid map as the second grid map.

6. The method according to claim 4, wherein the step of determining an attribute of each second grid in the second grid map according to attributes of the first grids used for generating the second grid comprises the steps of:

- determining that the attribute of the second grid is passable if the attributes of all the first grids used for generating the second grid are passable; or
- determining that the attribute of the second grid is impassable if the attributes of all the first grids used for generating the second grid include impassable.

7. The method according to claim 1, wherein the step of planning a transition path from an endpoint of the first path to an endpoint of the second path according to the first grid map comprises the steps of:

- determining positions of the endpoint of the first path and the endpoint of the second path on the first grid map;
- performing a path search on the first grid map to obtain a second set of feasible paths from the endpoint of the first path to the endpoint of the second path; and
- designating the shortest path among the second set of feasible paths as the travel path.

8. A robot comprising a memory and a processor, the memory storing a computer program, wherein when the processor executes the computer program, the steps of the grid map-based robot pathfinding method according to claim 1 is implemented by the robot.

9. A readable non-transitory storage medium storing a computer program, wherein when the computer program is executed by a processor, the steps of the grid map-based robot pathfinding method according to claim 1 is implemented by the robot.

10. A grid map-based robot pathfinding apparatus, comprising:

an obtaining module configured to obtain a first grid map and a second grid map, wherein the second grid map is generated by merging grids in the first grid map, and the resolution of the second grid map is lower than that of the first grid map;

a planning unit configured to plan a travel path of a robot from a current position to a preset target point according to the second grid map; and a processing unit configured to:

determine an obstacle position if the travel path is impassable, determine a first path of the robot from the current position to the obstacle position based on the second grid map, and determine a second path of the robot from the preset target point to the obstacle position based on the second grid map;

plan a transition path from an endpoint of the first path to an endpoint of the second path according to the first grid map; and obtain a target path of the robot according to the first path, the second path, and the transition path, wherein the apparatus drives the robot from the current position to the preset target point by following the target path.

* * * * *